Sept. 6, 1966  J. GASSMANN ET AL  3,270,717
ROTARY-PISTON INTERNAL COMBUSTION ENGINE OF
TROCHOIDAL CONSTRUCTION
Filed Oct. 9, 1961   3 Sheets-Sheet 1

*INVENTORS*
JOHANNES GASSMANN
RICHARD EHRHARDT
BY
*Dickes and Craig*
*ATTORNEYS*

United States Patent Office 3,270,717
Patented Sept. 6, 1966

3,270,717
ROTARY-PISTON INTERNAL COMBUSTION
ENGINE OF TROCHOIDAL CONSTRUCTION
Johannes Gassmann, Altbach, near Esslingen (Neckar), and Richard Ehrhardt, Stuttgart-Unterturkheim, Germany, assignors to Daimler-Benz Aktiengesellschaft, Stuttgart-Unterturkheim, Germany
Filed Oct. 9, 1961, Ser. No. 143,843
Claims priority, application Germany, Oct. 13, 1960, D 34,498
19 Claims. (Cl. 123—8)

The present invention relates to a rotary piston internal combustion engine for trochoidal construction, especially provided with a polygonal piston carrying out a rotary movement about an eccentric arranged on the driving shaft as internal envelope form within an epitrochoidally-shaped housing, in which, for purposes of achieving the rotary movement, at least one trochoidally-shaped cam track is arranged at the housing along which the piston is guided by means of guide rollers as disclosed more fully in the copending application Serial No. 115,800, filed on June 8, 1961, by Johannes Gassmann and Eberhard Braun, entitled "Rotary Piston Engine," and assigned to the assignee of the present application, the contents of this copending application being incorporated herein by reference insofar as necessary.

The present invention aims at an advantageous construction of the subject matter of the aforementioned copending application, and essentially consists in arranging the trochoidally-shaped cam track at guide parts movably supported within the housing of the internal combustion engine and in pressing the guide parts together with the cam track thereof against the guide rollers in an elastically yielding manner by appropriate pressure means, for example, by spring pressure, oil pressure or the like. It is possible thereby to eliminate any play between the guide rollers and the cam track so that the rotational speed ratio necessary for proper operation of the internal combustion engine between the driving shaft or the eccentric connected with the driving shaft and the piston supported on the eccentric can be maintained with a high degree of accuracy. For purposes of absorbing pressure shocks directed against the piston, there may also be provided, according to a further feature of the present invention, in addition to the pressure means, a damping means, for example, a throttling means in case of use of oil which will effectively damp movements of the guide parts provided with the cam track in opposition to the direction of pressure by the pressure means.

The cam track may thereby be arranged in a simple manner on two guide parts separated by a separating gap and the separating gap may be disposed advantageously in the direction of the major axis of the cam track.

Both guide parts may thereby be pivotally or swingably arranged in an advantageous manner at diametrically opposite ends about bolt members fixed at the housing. Preferably in proximity to the bolts about which the guide parts pivot, there may be arranged adjusting screws for the adjustment of the axial play. Additionally, an abutment screw or bolt may be provided in each guide part remote from the pivot axis thereof for limiting the extent of the swinging or pivoting movement thereof.

The several pressure means for producing the pivot movement may be arranged for both guide parts within one and the same guide part at a distance from each other. The pressure means may consist of spring-loaded pistons supported within bores. For purposes of damping, the spaces accommodating the springs may be operatively connected through throttling bores with oil spaces or with pressure oil supply lines in order to produce a pressure on the pistons.

Furthermore, in order to enable a shock free passage of the guide rollers over the separating joint between the guide parts, an overlap or the like may be provided at the separating joint. The separating joint may also be designed with an inclination.

Accordingly, it is an object of the present invention to provide a rotary-piston internal combustion engine of the type which is provided with a polygonal piston adapted to rotate within an internal combustion engine of epitrochoidal construction and in which the rotary movement is imparted to the piston by means of a cam and cam follower arrangement, which is so constructed and arranged as to eliminate in an effective and simple manner the problem of play encountered with prior art constructions.

Another object of the present invention resides in the provision of a guide arrangement consisting of cam track means and follower means for imparting a rotary movement to a polygonal piston of a rotary piston internal combustion engine of epitrochoidal construction in which the guide parts including the cam tracks are elastically yieldingly pressed against the guide rollers to eliminate, for all practical purposes, any play therebetween and thereby assure maintenance of the predetermined rotary speed ratio between the drive shaft and the piston required for proper operation of this type of internal combustion engine.

A still further object of the present invention resides in the provision, by simple means, of a damping arrangement for the cam track and cam follower guide arrangement for internal combustion engines of the type described hereinabove to assure smooth and shock-free operation thereof.

These and other objects, features and advantages of the present invention will become more obvious from the following description when taken in connection with the accompanying drawing which shows, for purposes of illustration only, one embodiment in accordance with the present invention, and wherein FIGURE 1 is a schematic cross sectional view through the housing of an internal combustion engine in accordance with the present invention;

Figure 1:
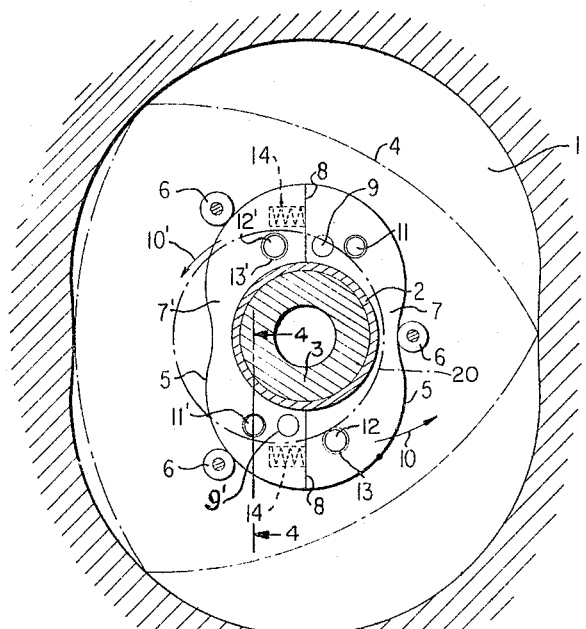

Referring now to the drawing wherein like reference numerals are used throughout the various views to designate corresponding parts, and more particularly to FIGURE 1, reference numeral 1 designates therein the side wall of the housing of the internal combustion engine in which is arranged the bearing bushing 2 for the drive shaft 3. The drive shaft 3 is provided with an eccentric 20 indicated in dash and dot lines on which rotates the piston 4, shown also in FIGURE 1 in dot and dash line, with a predetermined ratio with respect to the rotational speed of the drive shaft 3. The rotary movement is imparted to the piston 4 by the cam track 5 arranged at the side wall 1 of the housing about the bearing bushing 2, whereby the piston 4 is guided along the cam track 5 by means of guide rollers 6 supported at the piston 4. For purposes of eliminating any play between the cam track 5 and the guide rollers 6, the cam track 5 is arranged on the mutually corresponding, disk-shaped guide parts 7 and 7'. The separating joint or gap 8 between these guide parts 7 and 7' is disposed within the major axis of the cam track 5. Each guide part 7 and 7' is pivotally supported about a bolt 9 and 9' for pivotal movement in the direction of arrow 10 and 10', respectively, whereby the bolts 9 and 9' are arranged in the side wall 1 and are disposed with respect to the separating joint 9 at diametrically opposite and radially inner ends of the guide parts 7 and 7'. In proximity to the pivot bolts 9 and 9', each guide part 7 and 7' is retained in the axial direction by appropriate screws 11 and 11' provided with spacer disks. Other screws 12 and 12', illustrated in FIGURE 1 only as bolts, which are arranged at each guide part 7 and 7' within bores 13 and 13' at the end opposite the bolts 9 and 9' serve as limit means for the swinging movements of the guide parts 7 and 7' in the direction of arrows 10 and 10'. The swinging movements in the direction toward the guide rollers 6 are thereby caused by the pressure springs 14 which are arranged within the guide part 7'.

Figure 2:
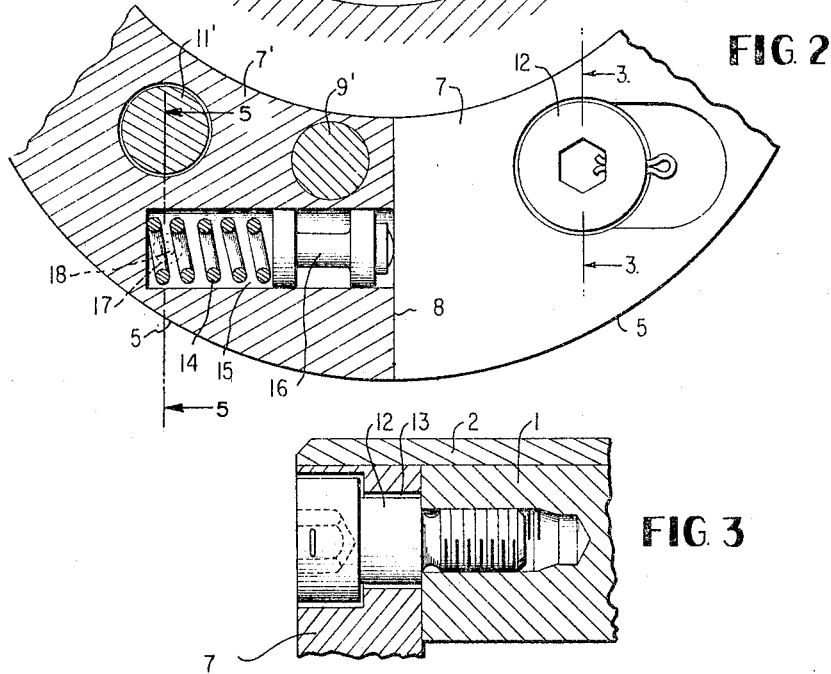
FIGURE 2 is a partial cross sectional view, on an enlarged scale, of the pivotal connection of the guide parts with the cam tracks.
Figure 5:
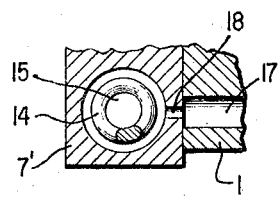
FIGURE 5 is a cross-sectional view taken along 5—5 of FIGURE 2.

As is more clearly visible from FIGURE 2, each pressure spring 14 is arranged within a bore 15 whereby the pressure springs 14 abut against the guide part 7 by means of pistons 16 arranged within the bores 15. For purposes of damping the movements of the guide parts 7 and 7' in the direction toward each other, pressure oil is used which is supplied to the bores 15 by means of pressure lines 17 through throttling bores 18 (FIGURE 5).

Figure 3:
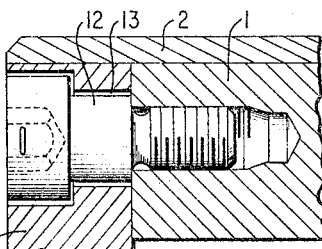
FIGURE 3 is a cross sectional view taken along line 3—3 of FIGURE 2.
Figure 4:
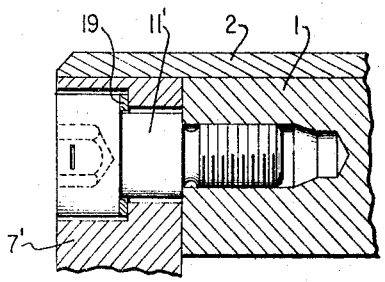
FIGURE 4 is a cross-sectional view taken along line 4—4 of FIGURE 1.

FIGURE 3 illustrates that any movability of the guide parts 7 and 7' together with the cam track 5 is possible only within a limited extent; for the abutment screws 12 permit only paths for such swinging movements which are slightly larger than the sum of the bearing play of the drive shaft 3 within the housing plus the play of the piston 4 on the accentric.

It can be readily recognized from the drawing that at least two guide rollers 6 always cooperate with the cam track 5.

Figure 6:
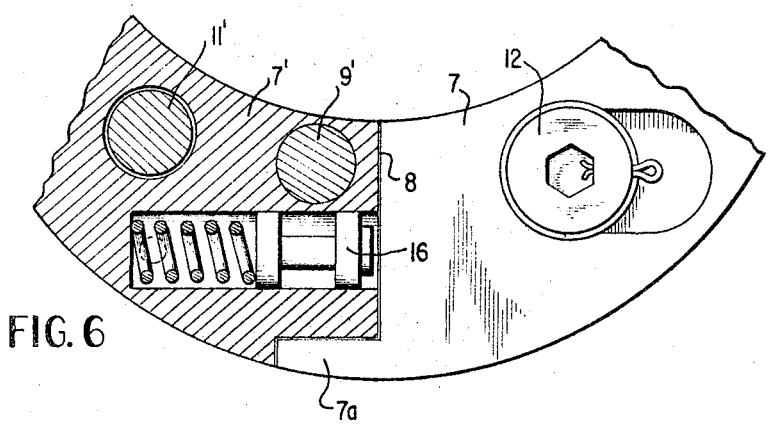
FIGURE 6 is a partial cross-sectional view, on an enlarged scale, similar to FIGURE 2, of the pivotal connection of the guide parts with the cam tracks of a modified embodiment in accordance with the present invention.

FIGURE 6 illustrates the pivotal connection of the guide parts 7 and 7', similar to FIGURE 2, whereby an overlap by the extension 7a is provided at the separating joint 8 between the two guide parts 7 and 7'.

Figure 7:
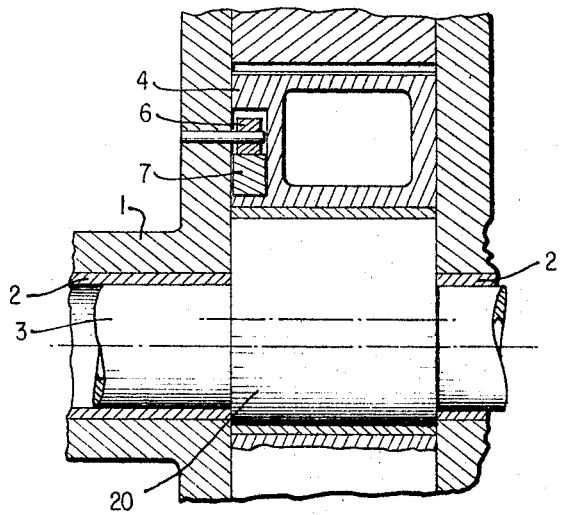
FIGURE 7 is a partial axial cross-sectional view through the housing of a modified embodiment of an internal combustion engine in accordance with the present invention.
Figure 8:
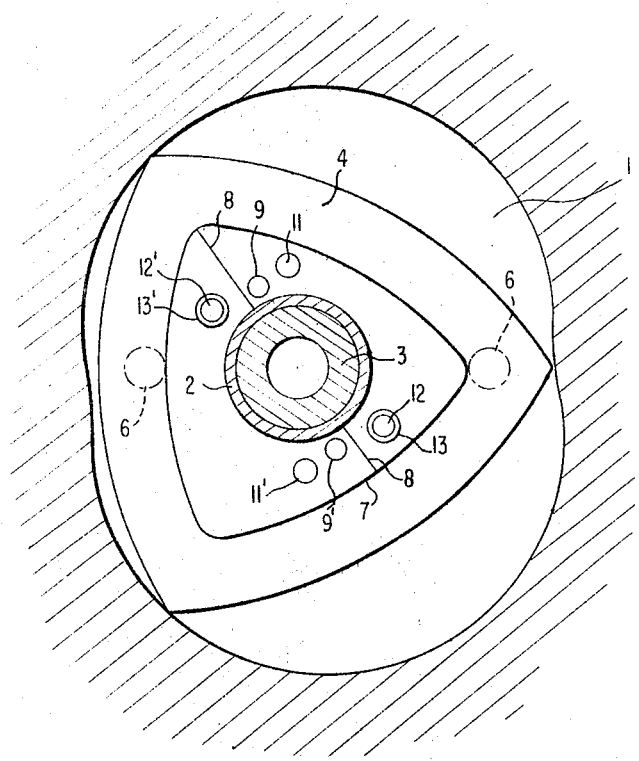
FIGURE 8 is a schematic cross-sectional view through the housing of an internal combustion engine, similar to FIGURE 1, and illustrating the embodiment of FIGURE 7.

While we have shown and described one embodiment in accordance with the present invention, it is obvious that the same is not limited thereto but is susceptible of many changes and modifications within the spirit and scope thereof. For example, the advantages derived from the specified measures taken in accordance with the present invention with the guidance of pistons within rotary-piston internal combustion engines along separate cam tracks are also attainable if the cam track is arranged at the piston and the guide rollers cooperating therewith are supported at the housing. Such an arrangement is illustrated in FIGURE 7 where again like reference numerals are used as in FIGURE 1. In FIGURE 7, the drive shaft 3 is suitably supported by bearing bushing 2 in the side walls 1 of the engine housing. The piston 4 is rotatably mounted about the eccentric 20 rigid with the drive shaft 3. The guide rollers 6 are suitably supported by any conventional means in the side wall 1 of the piston and cooperate with the cam tracks arranged on the disk-shaped guide parts of which only guide part 7 is visible in FIGURE 7. The guide parts are thereby secured at the piston 4 in the manner disclosed with the preceding embodiment.

Thus, it is clear that the present invention is not limited to the details of the illustrated embodiment, but may be modified in numerous ways, without departing from the spirit and scope of the present invention, and we therefore do not wish to be limited to the details shown and described herein but intend to cover all such changes and modifications as are encompassed by the scope of the appended claims.

We claim:

1. A rotary piston internal combustion engine of trochoidal construction comprising drive shaft means including eccentric means, polygonal piston means carrying out a rotary movement about said eccentric means as internal envelope form within an epitrochoidally-shaped housing, and means for imparting to said piston means a rotary movement about said eccentric means including a plurality of guide parts, cam means arranged at said guide parts and guide roller means, said guide parts being movably arranged at one of the two parts consisting of said piston means and said engine housing and said guide roller means being disposed at the other of said two parts, and pressure means elastically yieldingly pressing said guide parts with the cam means thereof against said guide roller means.

2. A rotary piston internal combustion engine of trochoidal construction comprising drive shaft means including eccentric means, polygonal piston means carrying out rotary movements about said eccentric means as internal envelope form within an epitrochoidally-shaped housing, and means for imparting to said piston means a rotary movement about said eccentric means including a plurality of guide parts, cam means arranged at said guide parts and guide roller means, said guide parts being movably arranged at one of the two parts consisting of said piston means and said engine housing and said guide roller means being disposed at the other of said two parts, and pressure means elastically yieldingly pressing said guide parts with the cam means thereof against said guide roller means including damping means for damping movements of said guide parts and cam means in a direction opposite to the direction of said pressure means.

3. A rotary piston internal combustion engine of trochoidal construction, especially of the type having a drive shaft including an eccentric and a polygonal piston carrying out rotary movements about said eccentric as internal envelope form within an epitrochoidally-shaped housing, comprising means for imparting to said piston a rotary movement about said eccentric including two guide parts, cam means arranged at said guide parts, guide roller means, said guide parts being movably arranged at one of the two parts consisting of said piston means and said engine housing and said guide roller means being disposed at the other of said two parts, bolt means for pivotally mounting diametrically opposite end portions of said guide parts at said housing, and means elastically yieldingly pressing said guide parts with the cam means thereof against said guide roller means.

4. A rotary piston internal combustion engine of trochoidal construction, especially of the type having a drive shaft inluding an eccentric and a polygonal piston carrying out rotary movements about said eccentric as internal envelope form within an epitrochoidally-shaped housing, comprising means for imparting to said piston a rotary movement about said eccentric including two guide parts, cam means arranged at said guide parts, guide roller means, said guide parts being movably arranged at one of the two parts consisting of said piston means and said engine housing and said guide roller means being disposed at the other of said two parts, bolt means for pivotally mounting diametrically opposite end portions of said guide parts at said housing, threadable adjusting means which enable swinging movements thereabout of said guide parts for adjusting the axial play thereof, and means elastically yieldingly pressing said guide parts with the cam means thereof against said guide roller means.

5. A rotary piston internal combustion engine of trochoidal construction, especially of the type having a drive shaft including an eccentric and a polygonal piston carrying out rotary movements about said eccentric as internal envelope form within an epitrochoidally-shaped housing, comprising means for imparting to said piston a rotary movement about said eccentric including two guide parts, cam means arranged at said guide parts, guide roller means, said guide parts being movably arranged at one of the two parts consisting of said piston means and said engine housing and said guide roller means being disposed at the other of said two parts, bolt means for pivotally mounting diametrically opposite end portions of said guide parts at said housing, abutment means disposed in each guide part remote from the swinging axis thereof for limiting the swinging movements of said guide parts, and means elastically yieldingly pressing said guide parts with the cam means thereof against said guide roller means.

6. In a rotary piston internal combustion engine of trochoidal construction having a polygonal piston adapted to rotate about an eccentric provided on the drive shaft within an epitrochoidally-shaped housing and provided with cam means secured to one of the two parts consisting of said piston and said engine housing and cam follower means secured to other of said two parts, the improvement essentially consisting of guide members for said cam means, means movably supporting said guide members at said one of the two parts consisting of said piston and said engine housing, and pressure means elastically yieldingly pressing said guide members and therewith said cam means against said cam follower means.

7. A rotary piston internal combustion engine of trochoidal construction, especially of the type having a drive shaft including an eccentric and a polygonal piston carrying out rotary movements about said eccentric as internal envelope form within an epitrochoidally-shaped housing, comprising means for imparting to said piston a rotary movement about said eccentric including two guide parts with the separating joint therebetween coinciding substantially with the major axis, cam means arranged at said guide parts, guide roller means, said guide parts being movably arranged at one of the two parts consisting of said piston means and said engine housing and said guide roller means being disposed at the other of said two parts, bolt means for pivotally mounting diametrically opposite end portions of said guide parts at said housing, threadable adjusting means disposed in proximity to said bolt means which enable swinging movements thereabout of said guide parts for adjusting the axial play thereof, abutment means disposed in each guide part remote from the swinging axis thereof for limiting the swinging movements of said guide parts, and means elastically yieldingly pressing said guide parts with the cam means thereof against said guide roller means.

8. A rotary piston internal combustion engine of trochoidal construction, especially of the type having a drive shaft including an eccentric and a polygonal piston carrying out rotary movements about said eccentric as internal envelope form within an epitrochoidally-shaped housing, comprising means for imparting to said piston means a rotary movement about said eccentric means including a plurality of guide parts, cam means arranged at said guide parts, and guide roller means, said guide parts being movably arranged at one of the two parts consisting of said piston means and said engine housing and said guide roller means being disposed at the other of said two parts, and means for elastically yieldingly pressing said guide parts with the cam means thereof against said guide roller means.

9. A rotary piston internal combustion engine of trochoidal construction, especially of the type having a drive shaft including an eccentric and a polygonal piston carrying out rotary movements about said eccentric as internal envelope form within an epitrochoidally-shaped housing, comprising means for imparting to said piston a rotary movement about said eccentric including two guide parts with the separating joint therebetween coinciding substantially with the major axis, cam means arranged at said guide parts, guide roller means, said guide parts being movably arranged at one of the two parts consisting of said piston means and said engine housing and said guide roller means being disposed at the other of said two parts, bolt means for pivotally mounting diametrically opposite end portions of said guide parts at said housing, threadable adjusting means disposed in proximity to said bolt means which enable swinging movements thereabout of said guide parts for adjusting the axial play thereof, abutment means disposed in each guide part remote from the swinging axis thereof for limiting the swinging movements of said guide parts, and means elastically yieldingly pressing said guide parts with the cam means thereof against said guide roller means including several spring-loaded piston means for both of said guide parts and disposed in one of said guide parts remote from each other, and means for supplying oil under pressure to the spaces accommodating the springs for said spring-loaded piston means including throttling means for damping movements of said spring-loaded piston means in a direction opposite to the force exerted thereon by said springs.

10. In a rotary piston internal combustion engine of trochoidal construction having a polygonal piston adapted to rotate about an eccentric provided on the drive shaft within an epitrochoidally-shaped housing and provided with cam means having a major axis and secured to one of the two parts consisting of said piston and said engine housing and cam follower means secured to other of said two parts, the improvement essentially consisting of two guide members for said cam means separated from each other by a separating joint disposed approximately in said major axis, means movably supporting said guide members at said one of the two parts consisting of said piston and said engine housing, and pressure means elastically yieldingly pressing said guide members and therewith said cam means against said cam follower means.

11. In a rotary piston internal combustion engine of trochoidal construction having a polygonal piston adapted to rotate about an eccentric provided on the drive shaft within an epitrochoidally-shaped housing and provided with cam means having a major axis and secured to one of the two parts consisting of said piston and said engine housing and cam follower means secured to other of said two parts, the improvement essentially consisting of two guide members for said cam means separated from each other by a separating joint disposed approximately in said major axis, means movably supporting said guide members at said one of the two parts consisting of said piston and said engine housing, and pressure means elastically yieldingly pressing said guide members and therewith said cam means against said cam follower means, an overlap being provided at said guide members at said separating joint.

12. In a rotary piston internal combustion engine of trochoidal construction having a polygonal piston adapted to rotate about an eccentric provided on the drive shaft within an epitrochoidally-shaped housing and provided with cam means having a major axis and secured to one of the two parts consisting of said piston and said engine housing and cam follower means secured to other of said two parts, the improvement essentially consisting of two guide members for said cam means separated from each other by a separating joint disposed approximately in said major axis, means movably supporting said guide members at said one of the two parts consisting of said piston and said engine housing, and pressure means elastically yieldingly pressing said guide members and therewith said cam means against said cam follower means, said separating joint being disposed obliquely.

13. In a rotary piston internal combustion engine of trochoidal construction having a polygonal piston adapted to rotate about an eccentric provided on the drive shaft within an epitrochoidally-shaped housing and provided with cam and cam follower means secured, respectively, to one of the two parts consisting of said piston and said engine housing, the improvement essentially consisting of guide parts for said cam means, means movably supporting said guide parts at one of the two parts consisting of said piston and said engine housing, and pressure means including spring-loaded piston means disposed within bores for elastically yieldingly pressing said guide parts and therewith said cam means against said cam follower means.

14. In a rotary piston internal combustion engine of trochoidal construction having a polygonal piston adapted to rotate about an eccentric provided on the drive shaft within an epitrochoidally-shaped housing and provided with cam and cam follower means secured, respectively, to one of the two parts consisting of said piston and said engine housing, the improvement essentially consisting of guide parts for said cam means, means movably supporting said guide parts at one of the two parts consisting of said piston and said engine housing, and pressure means including spring-loaded piston means disposed within bores for elastically yieldingly pressing said guide parts and therewith said cam means against said cam follower means and means for supplying to the spaces accommodating the springs of said spring-loaded piston means with a hydraulic medium under pressure.

15. In a rotary piston internal combustion engine of trochoidal construction having a polygonal piston adapted to rotate about an eccentric provided on the drive shaft within an epitrochoidally-shaped housing and provided with cam and cam follower means secured, respectively, to one of the two parts consisting of said piston and said engine housing, the improvement essentially consisting of guide parts for said cam means, means movably supporting said guide parts at one of the two parts consisting of said piston and said engine housing, and pressure means including spring-loaded piston means disposed within bores for elastically yieldingly pressing said guide parts and therewith said cam means against said cam follower means and means for supplying to the spaces accommodating the springs of said spring-loaded piston means with a hydraulic medium under pressure, said last-mentioned means including throttling means to damp oppositely directed movements of said guide parts.

16. In a rotary piston internal combustion engine of trochoidal construction having a polygonal piston adapted to rotate about an eccentric provided on the drive shaft within an epitrochoidally-shaped housing and provided with cam and cam follower means secured, respectively, to one of the two parts consisting of said piston and said engine housing, the improvement essentially consisting of two guide parts for said cam means, means including bolt means disposed near diametrically opposite ends of said guide parts for swingably supporting said guide parts at one of the two parts consisting of said piston and said engine housing, and pressure means elastically yieldingly pressing said guide parts and therewith said cam means against said cam follower means.

17. In a rotary piston internal combustion engine of trochoidal construction having a polygonal piston adapted to rotate about an eccentric provided on the drive shaft within an epitrochoidally-shaped housing and provided with cam and cam follower means secured, respectively, to one of the two parts consisting of said piston and said engine housing, the improvement essentially consisting of two guide parts for said cam means, means including bolt means disposed near diametrically opposite ends of said guide parts for swingably supporting said guide parts at one of the two parts consisting of said piston and said engine housing and limit means in each guide part for effectively limiting the swinging movements thereof, and pressure means elastically yieldingly pressing said guide parts and therewith said cam means against said cam follower means.

18. In a rotary piston internal combustion engine of trochoidal construction having a polygonal piston adapted to rotate about an eccentric provided on the drive shaft within an epitrochoidally-shaped housing and provided with cam and cam follower means secured, respectively, to one of the two parts consisting of said piston and said engine housing, the improvement essentially consisting of guide parts for said cam means, means movably supporting said guide parts at one of the two parts consisting of said piston and said engine housing, pressure means elastically yieldingly pressing said guide parts and therewith said cam means against said cam follower means, and damping means for damping movements of said guide parts directed oppositely to the direction of said pressure means.

19. In a rotary piston internal combustion engine of trochoidal construction having a polygonal piston adapted to rotate about an eccentric provided on the drive shaft within an epitrochoidally-shaped housing and provided with cam and cam follower means secured, respectively, to one of the two parts consisting of said piston and said engine housing, the improvement essentially consisting of guide parts for said cam means, means movably supporting said guide parts at one of the two parts consisting of said piston and said engine housing, pressure means elastically yieldingly pressing said guide parts and therewith said cam means against said cam follower means, and damping means constituted by throttling means for a pressure fluid for damping movements of said guide parts directed oppositely to the direction of said pressure means.

No references cited.

MARK NEWMAN, *Primary Examiner.*

RALPH H. BRAUNER, JOSEPH H. BRANSON, JR., *Examiners.*

SAMUEL LEVINE, F. T. SADLER, *Assistant Examiners.*